US007049975B2

(12) United States Patent
Vanderah et al.

(10) Patent No.: US 7,049,975 B2
(45) Date of Patent: May 23, 2006

(54) REPORTING REGULATOR FOR MANAGING A GAS TRANSPORTATION SYSTEM

(75) Inventors: Richard Joseph Vanderah, Marshalltown, IA (US); Bruce Frederick Grumstup, Marshalltown, IA (US); Paul Robert Adams, Marshalltown, IA (US)

(73) Assignee: Fisher Controls International LLC, St. Louis, MO (US)

( * ) Notice: Subject to any disclaimer, the term of this patent is extended or adjusted under 35 U.S.C. 154(b) by 694 days.

(21) Appl. No.: 10/052,426

(22) Filed: Jan. 23, 2002

(65) Prior Publication Data
US 2002/0143478 A1 Oct. 3, 2002

Related U.S. Application Data

(60) Provisional application No. 60/266,126, filed on Feb. 2, 2001, provisional application No. 60/266,264, filed on Feb. 2, 2001.

(51) Int. Cl.
G08B 23/00 (2006.01)

(52) U.S. Cl. .............................. 340/870.02; 340/870.03

(58) Field of Classification Search ........... 340/870.02, 340/870.03
See application file for complete search history.

(56) References Cited

U.S. PATENT DOCUMENTS 5,541,589 A * 7/1996 Delaney ................. 340/870.02
5,567,875 A * 10/1996 Adams .......................... 73/201
5,586,305 A 12/1996 Eidson et al. ................ 395/500
5,677,947 A * 10/1997 Oliver ..................... 379/106.03
5,844,134 A * 12/1998 Jiles ............................. 73/201
6,124,806 A 9/2000 Cunningham et al. . 340/870.02
6,369,719 B1 * 4/2002 Tracy et al. ........... 340/870.02
6,747,571 B1 * 6/2004 Fierro et al. ........... 340/870.02
6,778,099 B1 * 8/2004 Meyer et al. .......... 340/870.02

FOREIGN PATENT DOCUMENTS

EP 0 563 713 A2 10/1993
EP 0 574 241 A1 12/1993
EP 0 595 283 A2 5/1994

OTHER PUBLICATIONS

PCT International Search Report issued in PCT/US02/02579, Aug. 26, 2002.

* cited by examiner

Primary Examiner—Albert K. Wong
(74) Attorney, Agent, or Firm—Marshall, Gerstein & Borun LLP

(57) ABSTRACT

A reporting regulator for use in a gas transportation system includes an electrical interconnection that couples a plurality of input ports to a processor and a memory. Sensor data is received at the input ports and the data is stored into the memory. The reporting regulator is assigned a unique identification number such as a MAC address. The reporting regulator marks the received sensor data with attributes such as an identification number, a time stamp or a date stamp. After marking the data, the data is transmitted to a database location. The marked data can be reassembled in time and space by a central computer using the attributes. A processor can utilize this data to monitor, characterize and control an entire gas transportation system. System events can be pinpointed in time and space using the marked data. Further, system characterization and performance metrics can be utilized to improve system efficiency, emergency management, scheduling of preventive maintenance, and billing methods.

36 Claims, 6 Drawing Sheets

REPORTING REGULATOR FOR MANAGING A GAS TRANSPORTATION SYSTEM

CROSS-REFERENCE TO RELATED APPLICATIONS

This application claims priority from U.S. Provisional Application Ser. No. 60/266,126 filed on Feb. 2, 2001 entitled "Method and System for Managing a Gas Distribution Network" and U.S. Provisional Application Ser. No. 60/266,264 entitled "Data Transfer Unit for a Gas Distribution System Having an Electronic Identification Number" also filed on Feb. 2, 2001.

TECHNICAL FIELD

This invention relates generally to a gas pressure regulator that acquires sensor data, marks the data with attributes (distinctive features)and provides the data to a central location. The invention further relates to a system for acquiring and processing data from a network of gas pressure regulators located in a plurality of widely distributed locations.

BACKGROUND

The process of monitoring and maintaining a gas production and distribution system is a difficult challenge. If done properly, this task includes processing massive quantities of data acquired over a large geographical area. Currently, gas transportation systems such as natural gas transportation systems (i.e. gas production, processing, pipeline and distribution systems) have very limited capability to acquire data, report data, organize data and monitor systems. One reason is the lack of harmonious data acquisition and communication systems. For example, acquiring gas transportation system data from multiple sensors at hundreds of locations, twenty-four hours a day, 365 days a year, merely creates large quantities of "unorganizable" data. Unorganizable data is not very useful because it cannot provide a sufficient overview of system operation, events, and phenomena.

A typical gas distribution system is partitioned into districts. Large pipes (gas mains) supply gas to districts through manifolds at district locations. A manifold is essentially a pipe with several openings for making several connections. In an average metropolis, hundreds of district sites exist and hundreds of thousands of supply lines are unmonitored. Most gas companies still utilize manual data collection systems. They send field technicians out to district sites to manually measure and record system parameters at various locations. Measurements are often hand written in a logbook. Thus, data received from various points in a gas system cannot be correlated by location or synchronized in time to provide a comprehensive overview of system operation. While significant sensor technology is available to periodically monitor or detect gas system parameters at district locations, data collection and data management tools for evaluating an entire gas transportation system are clearly deficient.

Valuable data can be gathered at ports in the transportation system (typically at district sites). However, currently there is not an efficient way to provide useful data to a central system. Even if data was available at a central location there is no efficient way to organize or manipulate the data to make it useful. As a result, characterization of an operational gas system is nearly impossible. Due to the lack of useable data, system wide events within a gas transportation system are not well understood. Further, system wide coordination of gas pressure control is not achievable. A gas company could maximize system performance, detect leaks, anticipate explosions or spills, and save millions of dollars annually if they could adequately monitor system wide events. Currently, data acquisition and process control systems for gas transportation systems lack comprehensive real time, dynamic management capabilities because of the less than perfect communication, control, and data processing systems.

FIG. 1, illustrates a hydrocarbon fuel production, pipeline, and distribution system or gas transportation system 3. Gas producers capture gas from the earth 1 and deliver the gas to distributors. Gas is extracted from a well 28, proceeds through a valve 5, is processed by a plant 11, and is compressed or pressurized by a pump 10 for delivery through a pipeline 4. The pipeline 4 transports gas to locations where it will be consumed, such as a first city 7, a second city 33 or a power plant 9. A second well 30 may also supply gas to the pipeline 4 via a plant 111 and a second pump 110.

In a gas transportation system, ownership of the gas may change many times. When ownership changes, meters 6 are utilized to measure the quantity of gas supplied, sold or purchased. A typical transfer of ownership would involve transfer from a producer to a distributor, or from distributor to a consumer. Additionally, mechanical pressure regulators 2 are typically present at custody transfer points to maintain a predetermined line pressure proximate to the meters 6. Pressure control is important to ensure meter accuracy. Additional pump substations 24 may be required to overcome frictional losses and boost sagging pressures within the gas system 3.

Often, a gas producer can utilize a distribution system (such as that associated with second city 33) as part of a gas transportation system. Thus, a producer's gas may travel through a city distribution system (second city 33) and supply a consumer (such as power plant 9) beyond the distribution system. Distribution system owners generally charge producers a transportation fee to transport gas through their distribution system(s).

All United States gas producers and distributors are regulated by either a state-sanctioned Department of Transportation (DOT) or the United States DOT. Maximum allowable line pressure and other regulations are strictly enforced by these DOT's. Thus, a distributor wants to maximize the pass-through volume by maintaining higher pressures, but must comply with DOT maximum pressure requirements and other regulations. Higher line pressures also create increased leakage in the system. However, without having adequate system wide data acquisition and pressure control, it is difficult to maximize profits and to comply with the regulations. Gas companies may acquire and store sensor data, but without adequate infrastructure to coordinate the data, the sensor data is virtually useless.

When a problem occurs in a gas transportation system, maintenance workers typically visit various locations and take a series of measurements. Based on these measurements, the maintenance worker may be able to locate faulty equipment or other problems. Often times however, due to the lack of data coordination, these measurements neither reveal the cause of the problem nor the solution to the problem.

Mechanical pressure regulators 2 have short lifetimes due to their moving parts and the harsh environment in which they must operate. A defective mechanical regulator located miles away from a detected problem may be the source of the problem. Manually troubleshooting a gas transportation system is typically accomplished by a procedure based on learned assumptions. This method is unstructured, time consuming and costly. Further, the test measurements are often manually recorded with a pen and paper and are discarded after a problem is solved. Thus, recorded or historical data is often unavailable or unorganized and therefore is useless.

Problems caused by impurities such as slugs of water or sludge entering the system can cause moving obstructions. Currently, detecting and curing moving obstructions is like "chasing a ghost." Impurities can cause inefficiencies such as loss of system capacity or premature failure of devices. Impurities can plug filters, meters, regulators or even consumer appliances. Currently there is no way of monitoring events such as the existence and movement of impurities.

FIG. 2 illustrates a more detailed view of a typical distribution system, such as that of the second city 33. Mechanical regulators are located at district sites 27 (denoted by black dots not all numbered) for controlling gas pressure to a district. A gas distribution system provides redundant paths or "feeds" to most locations. Thus, pressure or flow measurements on feed lines do not provide sufficient data to understand gas flow characteristics in a distribution system (i.e. which feed lines, main lines and/or district regulators supply how much gas to various districts). The gas company must still consider managing a massive volume of "loose" data. Typically, gas distribution companies cannot coordinate the data and identify where, why, and how loss occurs. It is also common for a gas company to manually adjust pressure settings at the district locations depending on seasonal demand and other dynamic phenomena.

A typical district site does not have access to power or communication lines. As a result, electronic communication and control at district locations has been very limited or non-existent. Further, implementing such infrastructure has been generally regarded as dangerous and prohibited by high implementation costs. What is needed is an efficient method for acquiring and communicating data and an efficient method for managing a gas transportation system data such that profits can be increased and disasters can be avoided.

SUMMARY

A reporting regulator used in a gas or fluid transportation system acquires, creates, stores, marks and transmits sensor data. In particular the reporting regulator marks the sensor data with attributes to identify a distinctive feature of the data such as the origin of the data, and then transmits the marked data to a central location. A database at the central location can organize or link the marked data utilizing the marks or attributes to make such a database useable by applications which can track properties of gas flowing through the transportation system and to identify problems in the system. With the use of such applications, the gas transportation system can be effectively characterized, evaluated and managed.

In one embodiment each reporting regulator includes an electrical interconnection connecting a plurality of input ports to a processor and a memory. Sensor data is received at the input ports and is stored in the memory. The reporting regulator can mark the sensor data with a fixed attribute such as an origin stamp which may be a unique identification number such as a MAC address or variable attributes such as a time stamp and/or a date stamp. At the central location a processor, such as a personal computer, can reassemble the data in time and space by using the marks. Events occurring within a gas transportation system can be monitored, characterized and controlled using the marked data. The use of this collected and reassembled data will allow gas companies to improve system efficiency, emergency management, scheduling of preventive maintenance, and billing of customers.

DETAILED DESCRIPTION

The shortcomings of present gas transportation systems are addressed by placing reporting regulators throughout a gas transportation system. Each reporting regulator may include a commercially available sensors, and a gas pressure regulator equipped with a reporting module. The reporting module collects data from the sensors in the same general area as the gas pressure regulator, marks the data and then transmits the data to receivers. A receiver could be a computer at a central location, another reporting regulator or another device within the gas transportation system. The reporting module has at least one input such as a receive port for accepting communication signals or system variables. The input can receive sensor data of any communication format such as electric or fiber optic. In other embodiments sensors are integral with the reporting module and the input receives system variables such as pressure through a hose connected to the gas transportation system.

The sensor data may be indicative of parameters, variables or properties of the fluid transportation system and the reporting module marks the sensor data with attributes that define something about the data. Specifically, an attribute can be supplementary information indicating one or more distinct features of the data. For example, one attribute may indicate the data's origin (time, date, and location where it was acquired).

The reporting module then transmits (reports) the marked data to a central location. Marking the sensor data with origin information enables the large volume of data to be easily organized in a meaningful way to identify flow patterns and characteristics of the transportation system. For example, the data can be organized to monitor events, to understand operational characteristics, to review performance, to view historical data, locate emergencies, evaluate improvements and to demonstrate the control and flow of gas throughout the distribution system.

Figure 3A:
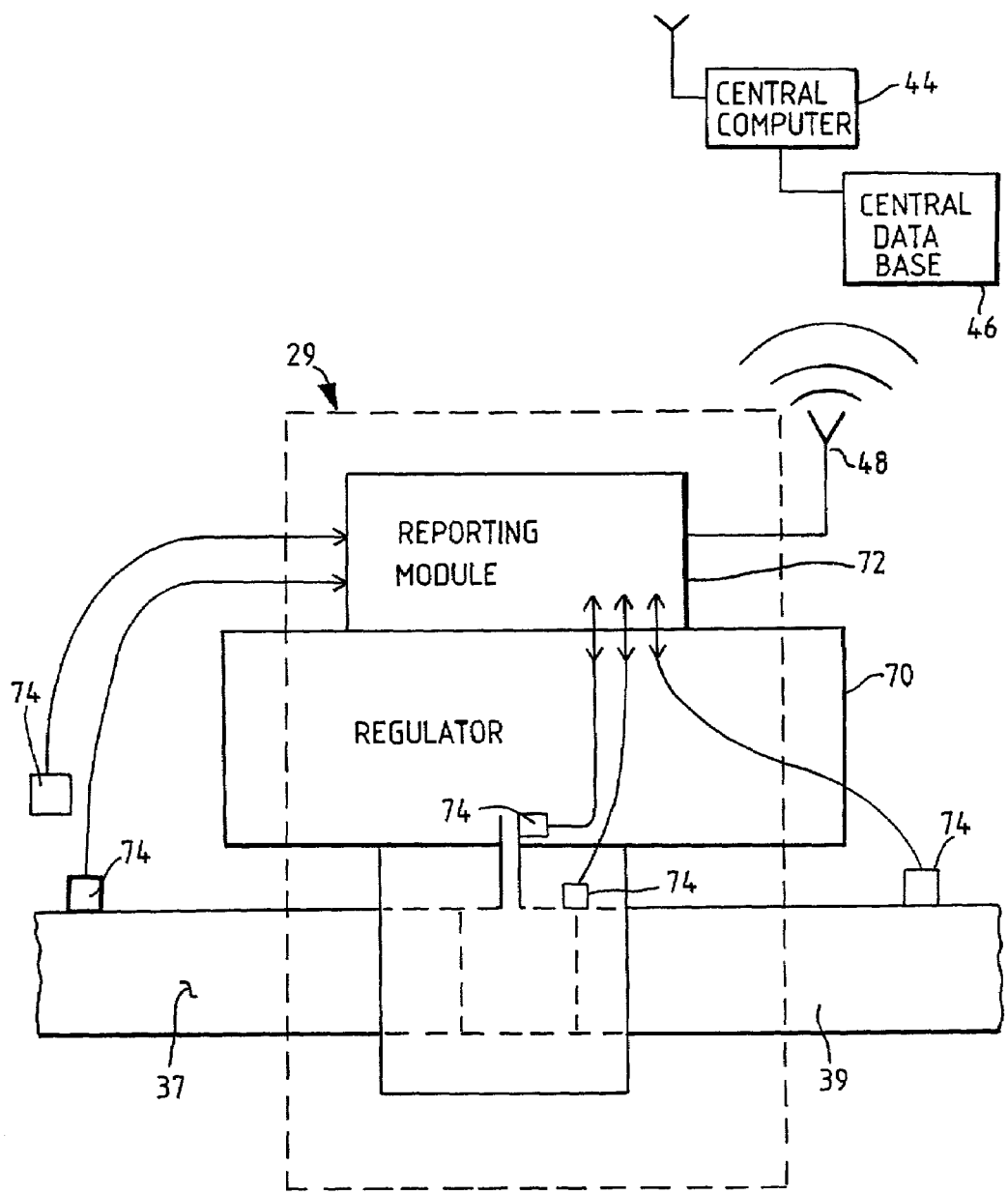
FIG. 3A is a block diagram of a gas pressure regulator connected to a reporting module.

Referring to FIG. 3A, a block diagram of a reporting regulator 29 is illustrated. As shown, the reporting regulator 29 includes a gas pressure regulator 70 and a reporting module 72. As is typical, gas pressure regulator 70 controls the pressure of a gas at an output port 39. Thus, pressure at an input port 37 of gas pressure regulator 70 may vary, but ideally, the pressure at the output port 39 remains constant.

Any regulator commonly used to control pressure of gas maybe used as a reporting regulator. For example, a series 300 regulator available from Fisher Controls International, Inc. may be utilized. As will be understood by one skilled in the art, reporting module 72 could be integrally manufactured with regulator 70 or as an independent module that can be retrofitted to an existing regulator. Reporting module 72 sends information to a central processor 44 via an antennae 48 and the central processor 44 stores the data in a central database 46. If the regulator 70 does not have sensors that can provide electronic data to reporting module 72 then sensors 74 can be installed into the gas transportation system proximate to the reporting module 72.

Generally, a gas pressure regulator controls pressure by moving a throttling element within the path of gas flow. An improved gas pressure regulator such as the model RF-110 available from Fisher Controls International Inc., utilizes electronic sensor data such as input and output pressure to improve pressure control accuracy. The electronic sensor data can also be utilized to calculate additional system or device parameters. For example, flow volume and device health status can be determined by processing multiple sensor inputs. The term "sensor data" as used herein should be understood as any data that can be transmitted to a central system. Although a device, such as a regulator or a reporting module, may not be considered a sensor, it can provide sensor data by processing data or calculating parameters using sensor data. Hence the term sensor data as utilized herein can be a value calculated from a variety of sensor inputs and provided by a device not typically considered to be a "sensor."

Figure 3B:
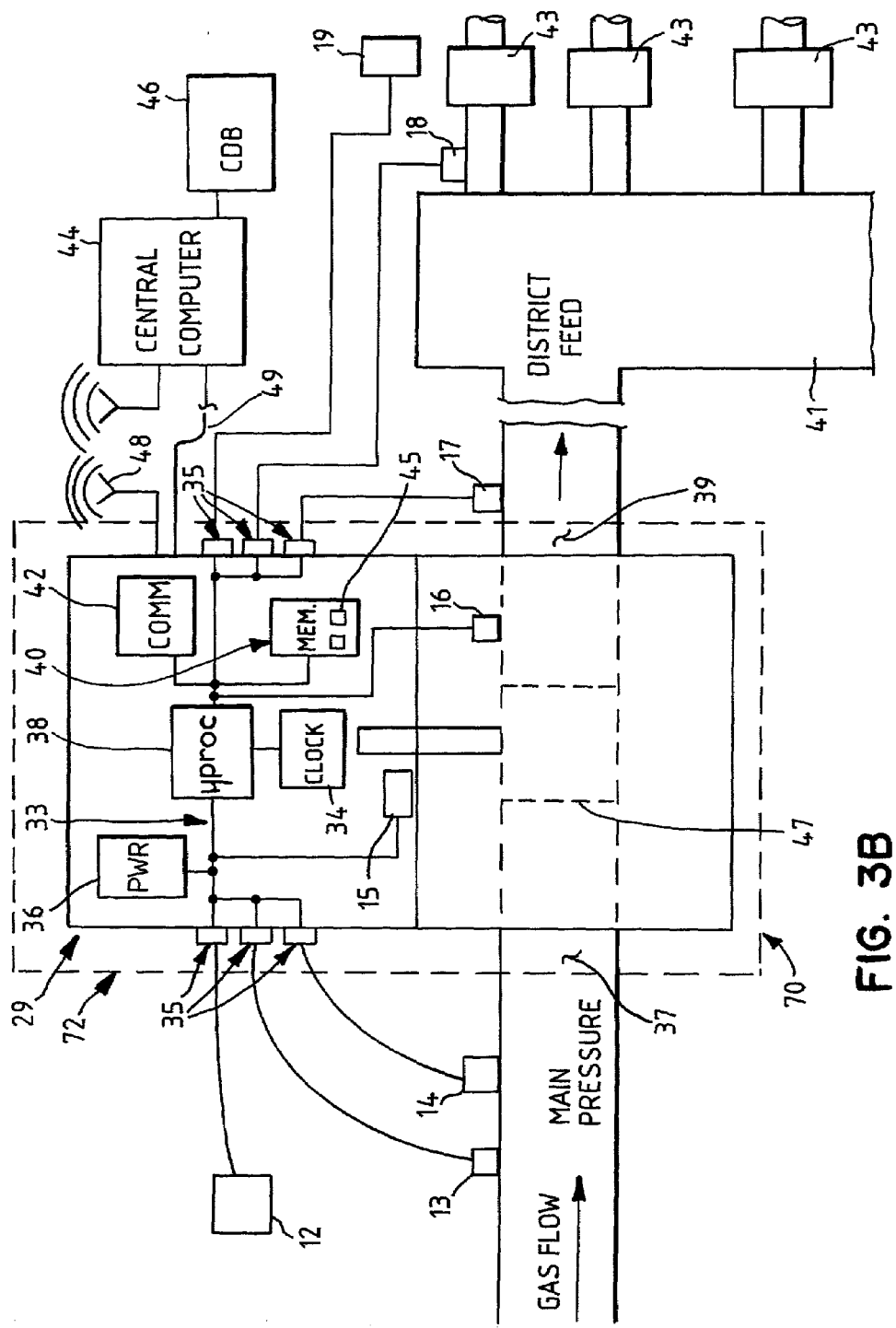
FIG. 3B is a block diagram of a reporting regulator.

FIG. 3B depicts an embodiment of a reporting regulator where the reporting module 72 is integrated with the gas pressure regulator 70 to create a reporting regulator 29. Reporting regulator 29 provides multiple ports 35 for connection of sensors 12–19. Typically, sensors 12–19 will provide data that is directly related to regulator operation or status. However, sensors 12–19 may provide data that is wholly unrelated to reporting regulator operation. Thus, reporting regulator 29 can operate as a data "hub" to collect all kinds of data from sensors located in the same general area as reporting regulator 29. Each sensor 12–19 may supply a different type of data to reporting regulator 29.

A processor 38 controls functions performed by reporting regulator 29 by executing a user defined instruction set 45 (e.g. software) which is stored in a memory 40. Memory 40 may be integral with processor 38 or it may be a separate device. The term "memory" as it is used herein should be given its broadest possible meaning. For example, a simple buffer or input register such as those required for electronic communications is considered "memory" as is the hardwired or direct coded logic or an application specific integrated circuit (ASIC).

The processor 38 may be a programmable logic device, it may be an ASIC or it may have the equivalent architecture of a multipurpose processor such as those found with modem personal computers. The term processor as used herein means any device that can receive electronic signals, convert the electronic signals and provide electronic signals different than the ones received to another device. The processor 38 accesses and executes the instruction set 45 and controls multiple functions of the reporting regulator 29. For example, processor 38 may change the position of throttling element 47 to control the pressure at the output port 39, and processor 38 can control input and output communications. Reporting regulator 29 accepts data from sensors 12-19 at ports 35 and stores the sensor data in memory 40. In the embodiment depicted, air temperature is detected by sensor 12, gas temperature is detected by sensor 13, pressure is detected by sensors 14,16,17,18, and regulator plug position is detected by sensor 15. Sensors 12, 13, 14, 17, 18, 19 which can be external to reporting regulator enclosure, may be coupled to a reporting regulator via electrical, mechanical or wireless connections.

After sensor data is acquired and marked by processor 38, the data can be transmitted to central computer 44 via communication circuit 42 and antennae 48. Central processor 44 may store the sensor data in central database 46. Reporting regulator 29 utilizes an electrical interconnection 33, such as a circuit board, integrated circuit or wires to interconnect components, which couples ports 35, processor 38, power source 36, memory 40, real time clock 34 and communication circuit 42 generally as depicted.

Instruction set 45 determines how processor 38 acquires, manipulates, processes, refines, stores and communicates data received from sensors 12–19. For example, instruction set 45 determines the sampling rate (the rate at which a sensor's output is read and stored) for each sensor 12-19. Processor 38 can also control the input and output communication methods, communication timing, data compression techniques, and sensor data conditioning (i.e. digital signal processing) to name a few.

Most importantly, the instruction set 45 determines how sensor data is marked with attributes. Sensor data attributes such as the time, date and location of the data acquisition can be concatenated to the sensor data to create marked data. Many methods for accomplishing concatenation of digital data are known and described in data processing and digital communication publications. Other attributes that can be marked on the sensor data are units, type of sensor data, sensor model number, and/or sensor serial number. For example, sensor data can be marked with units such as lbs./in$^2$ or Kpa. In a preferred embodiment processor 38 reads data from the sensors and then marks the sensor data with attributes prior to storing the data in memory 40.

In the depiction in FIG. 3B, reporting regulator 29 supplies a constant gas pressure to manifold 41. Manifold 41 then distributes the gas to reporting district regulators 43. Reporting district regulators 43 in-turn, supply gas to districts (not shown). In one embodiment, each reporting regulator is assigned a unique identification number and stores its identification number in its memory. Alternatively, a central processor 44 at a central location can store identification numbers for reporting regulators in a central memory. In this embodiment, data is marked based on the communication channel from which data is received. Central computer 44 would include a central processor, a central memory and a central instruction set (not individually depicted). There may be multiple central computers and the term "central computer" merely refers to a computer which can receive data from more than one reporting regulator and process such data. The assignment of identification numbers to individual reporting regulators 29 can be accomplished at the factory or after a reporting regulator is installed into a gas transportation system. The identification number assignment can be manually loaded into reporting regulator via port 35. Alternatively, the identification number can be transmitted by a central processor 44, at a central location and then received and stored by reporting regulator 29.

In one embodiment, reporting regulator is installed into a gas transportation system and then reporting regulator 29 is "auto-initialized" during its first "power up." During the auto-initialization or start up procedure, reporting regulator 29 is assigned an identification number and/or provided with the instruction set 45. Central computer 44 can automate the number assignment, number loading and power up procedure. Alternatively, an on-site technician can load the identification number and conduct the initialization procedure. A relationship between the installed location of reporting regulator 29 and the identification number can be established and stored in central database 46.

The unique identification number and the time clock 34 provide attributes for the sensor data. The sensor data can be marked with these attributes such that, regardless of when and where the sensor data is received or needed by a central system, it's origin in time, space, and type can be determined.

In another embodiment an installer (typically gas company personnel) loads an identification number into the memory 40 of reporting regulator 29 by connecting a portable instrument to one of the ports 35 of the reporting regulator 29. In accordance with this embodiment, a portable Global Positioning Receiver (GPS) can be plugged into a port 35 and latitude-longitude coordinates can be stored in memory 40. A GPS unit can also calibrate time clock 34. In this embodiment the marked sensor data can be synchronized in time and space with accurate GPS data.

Alternately, the electronic identification number can be a physical address loaded into reporting regulator 29 by the installer using, for example, a keypad. An installer might enter a street address, a district number, a node number, a value or other indicator which can be used to distinguish or identify a reporting regulator. In one embodiment each port 35 of reporting regulator 229 has an identification number which can be concatenated to the identification number of reporting regulator 29. In such an installation, each sensor will have it's own identity and the origin of all sensor data can be identified with great accuracy.

A separate set of benefits are achieved by assigning an arbitrary identification number to the reporting regulator at the factory 45. In this embodiment a table such as a relational database is utilized to cross-reference a reporting regulator's location with the identification number. For example, a unique Medium Access Control (MAC) address can be assigned to each reporting regulator 29 at the factory. Then, a relational database can associate the location at which a reporting regulator is installed with the assigned MAC address. A MAC address system allows reporting regulator 29 to communicate using a wireless Internet system. Wireless Internet communication hardware and software can be contained in communication circuit 42. Many electronic identification number assignment methods are currently available and nearly all of them can be effectively utilized by a reporting regulator system.

Reporting regulator 29 can transmit sensor data to central processor 44 in response to executing commands received from the instruction set 45. The movement of data from memory 40 to central processor 44 is often referred to as a data "download." When a download of sensor data occurs, processor 38 retrieves data from memory 40 and sends the data to communication circuit 42. Communication circuit 42 sends the data to central processor 44 via antenna 42, landline 49 or any other desired communication network.

Reporting regulator 29 should have sufficient memory capacity to store the amount of sensor data which reporting regulator 29 will acquire between data download intervals. For example, if reporting regulator 29 will be downloading sensor data to central processor 44 once a month, a minimum of one month's storage capacity/capability should be installed in reporting regulator 29. Efficient memory utilization techniques and data compression techniques can be utilized to enhance the storage capability of the reporting regulator 29.

In addition to a systematic data download, reporting regulator 29 can transmit sensor data upon a request from central computer 44. Instruction set 45 can instruct reporting regulator 29 to process sensor data prior to storing the data into memory 40. Alternatively, instruction set 45 can instruct reporting regulator 29 to mark the sensor data prior to transmitting the sensor data to central location 44.

A power source 36 is coupled to ports 35 via electrical interconnection 33. Reporting regulator 29 can supply power to sensors via ports 35. Power source 36 can be a battery, a fuel cell, a hard-wired connection to a generator or a power station, a solar cell or any other supply capable of providing a few milliwatts of power. Real time clock 34 provides time and date information, (attributes of the data) which can be utilized to stamp or mark the sensor data. Sensor data can be marked with more than one time and date stamp if desired. For example, data can be marked corresponding to the time and date which the sensor data was acquired, the time the data was sent by communication circuit 42 and/or the time the data is received by central processor 44. Time marked data allows for synchronization of past and present data to reveal events in the gas transportation system.

In one embodiment, reporting regulator 29 can function as a central location or as a central processor. Reporting regulator 29 can receive data from other reporting regulators and organize the data in memory 40. Reporting regulator 29 can also control other reporting regulators using the marked data in its database. An input/output device such as a keyboard and monitor can be connected to port 35 and data and parameters (information) from the entire fluid transportation system can be accessed or viewed. Reporting regulator 29 may store data for an entire system or it may only store data from regulators which are downstream. In addition reporting regulator 29 may only control devices that are downstream of it.

Figure 1:
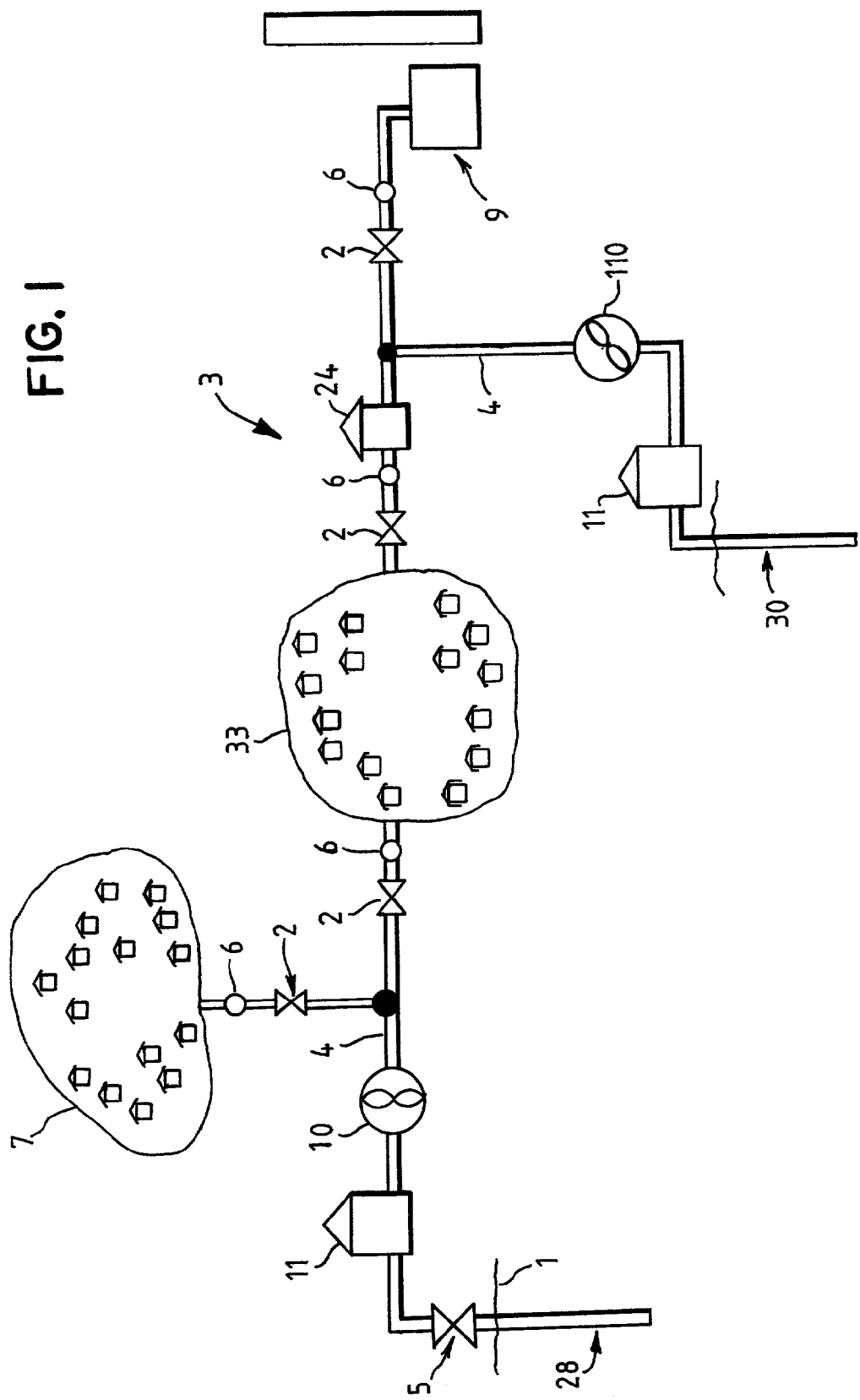
FIG. 1 illustrates a conventional gas transportation system.
Figure 2:
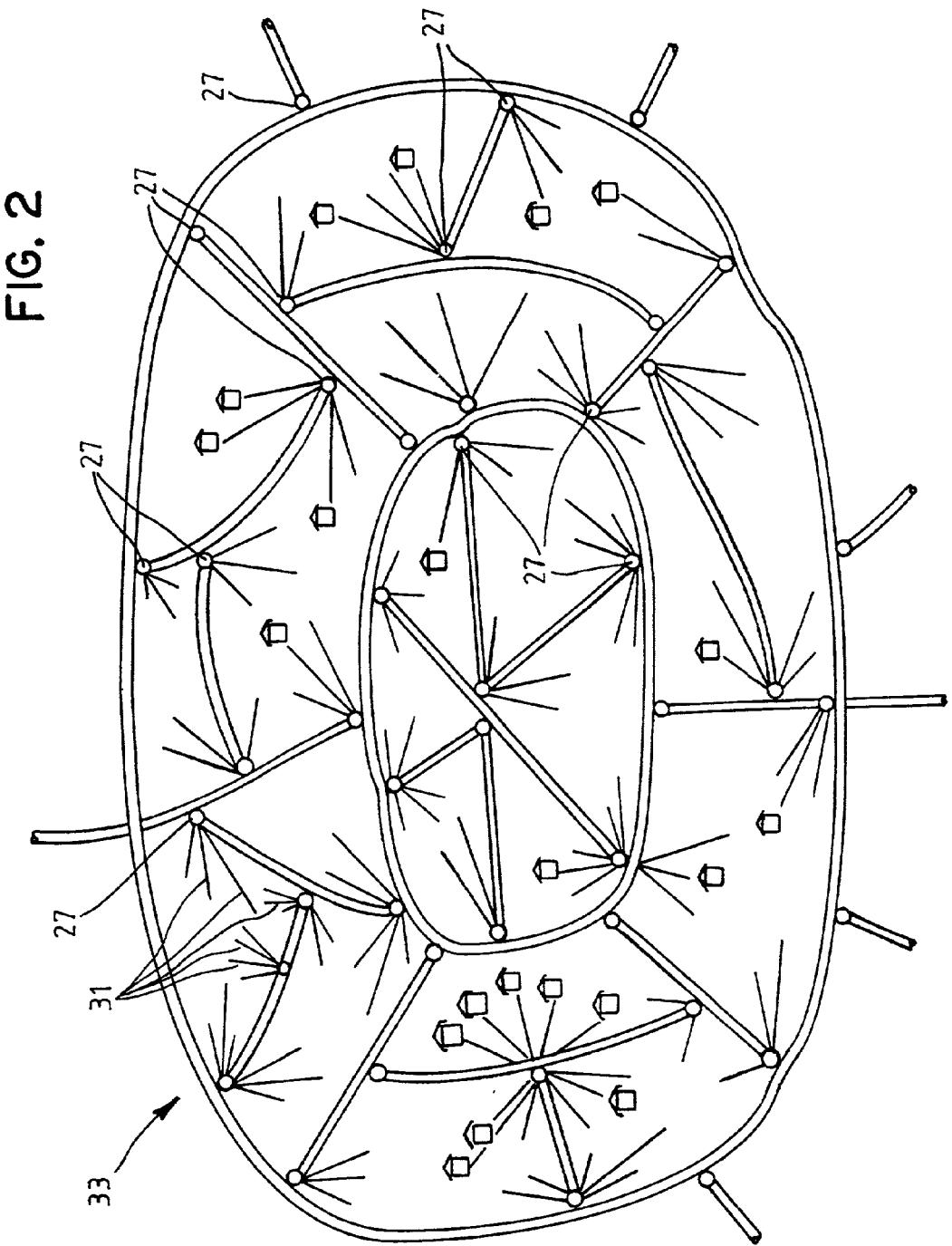
FIG. 2 depicts a conventional natural gas distribution system within a city having several districts.
Figure 4:
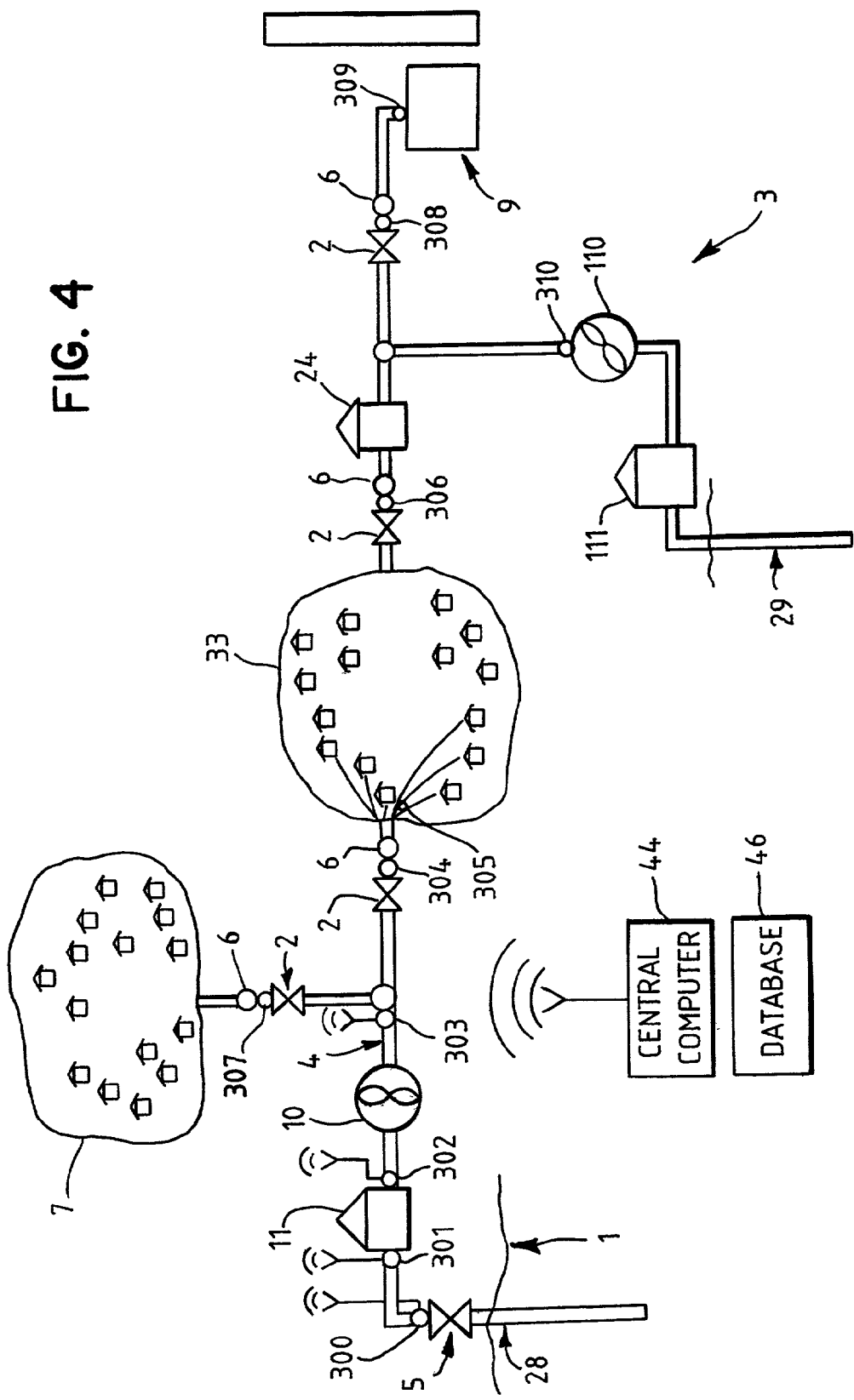
FIG. 4 depicts the gas transportation system of FIG. 1 having reporting regulators incorporated into the gas transportation system.

Referring now to FIG. 4, a gas transportation system 3 similar to the one described in FIG. 1 is illustrated, with the exception that reporting regulators 300–310 are installed throughout the gas transportation system 3. The gas transportation system 3 can span thousands of miles. For example, reporting regulator 300 may be located 1000 miles from the reporting regulator 309 and gas from the well 28 may, or may not reach the reporting regulator 309. Further a batch of poor quality gas may take weeks to travel from well 28 to power plant 9. The system of reporting regulators described herein, can track this type of operational phenomena as well as the effects of any abnormality as it travels through gas transportation system 3.

Mechanical regulators wear out and must be constantly repaired or replaced by gas companies. One of the benefits of the reporting regulator system described herein is that reporting regulators 300-310 are a direct replacement for existing mechanical regulators. Thus, an existing gas transportation system can be upgraded over time as mechanical pressure regulators fail and require replacement.

Central computer 44 receives marked sensor data from reporting regulators 300–310. Central processor 44 codifies the data in a relational database 46 by creating keys and logical links utilizing the marks on the sensor data. A relational database can reassemble the data in time, space and form to display past and present events within gas transportation system 3. The relational database is "sortable"

based on a user's preference. Existing database sort methods can be used to locate and display current or historical events.

If a user desires to view current events as they unfold, he/she can couple a data entry device, such as a keyboard and a monitor, to the reporting regulator 310 or to the central computer 44 and create requests for data from specific reporting regulators or from specific sensors. This embodiment allows a user to view current activity within the gas transportation system. For example, a user can command reporting regulators 302, 304 and 306 to continually transmit input and output pressure data and flow volume. Thus, responding to an interrogation, reporting regulators 300–310 can supply streaming, real time data from selected sensors. Real-time data allows a user to witness the progress of a moving event such as a pressure abnormality in gas transportation system 3. Viewing events as they unfold allows workers to provide corrective measures and to witness the system response in a real-time environment. It is preferred to be able to control the quantity of real time data transmissions from each reporting regulator so that the communication system does not get overloaded.

In the example in Table A below, the field or column entitled "District" defines the source or location origin of the data. The column "Data type" defines the form or type of data contained in the record (i.e., flow volume, pressure, temperature etc.) The "Time" data field displays the time that the sensor data was acquired. Table A may be representative of results from a user search or sort for the time and location of the lowest pressure recordings in the gas transportation system 3 on a given day. Attributes or supporting data such as the units, accuracy, or other data such as pit temperature at the location can also be displayed upon a user driven request.

TABLE A

| Date | Time | District | Type | Data Measurement |
|---|---|---|---|---|
| 01/02/01 | 21:20 | 253 | Press | 1.9 ft lbs. |
| 01/02/01 | 21:40 | 256 | Press | 2.0 ft lbs. |
| 01/02/01 | 21:20 | 251 | Press | 2.1 ft lbs. |
| 01/02/01 | 21:08 | 253 | flow | 30 ft³/min |
| 01/02/01 | 21:20 | 253 | Temp | 30° C. |
| 01/02/01 | 21:40 | 256 | flow | 20 ft³/min |
| 01/02/01 | 21:20 | 256 | Temp | 30° C. |

Searches and sorts to identify trends and problem areas can be accomplished quickly by performing a sort function on database 46. Allowing a user to reconfigure the order of the data in database 46 to show maximum or minimum values during a defined time period will present trends, events, leaks, inefficiencies and dangerous conditions to a user.

Additional possible fields for a gas transportation system database include any phenomena which a sensor can measure, any parameter that can be calculated and diagnostic or calibration information. For example sensor device status, outside temperature, gas temperature, leak detected, amount of leakage, impurity detected, amount of impurity detected, quality factor of the gas, gas composition, flow velocity, flow volume, device actuator position, input control signal, plugged filter, relief valve open, atmospheric pressure, element concentration level, pressure deviation, and pit water level are a few possible fields. The list discussed above is not to be considered as a complete list but merely as examples of possible fields or potentially useful data. In FIG. 4 only one central computer 44 is depicted. However, multiple central computers could be utilized (not shown). In fact, many gas company employees could store or access the same database 46 and a have a portable computer to manipulate a locally stored database.

In another embodiment, each central system provides service to a portion of a gas transportation system. When distributed central systems are utilized, redundant communication paths and redundant data allows the database to be utilized simultaneously by many users. Multi-user configurations and restricted access software currently available for computer networks will work effectively in a reporting regulator system. Further, reporting regulators 300–310 can communicate with one another which may be useful if communication with central computer 44 is not possible. Thus, reporting regulators 300–310 can store and then relay information to other locations.

Methods and procedures for determining gas transportation system performance and characteristics and implementation of such systems will now be discussed.

To implement a system for determining system phenomena, a central computer receives data from reporting regulators and stores the data in central memory. The central computer has a processor that utilizes an instruction set to process or manipulate the received data. The processed data can provide useful information to the user of the system.

Event Reconstruction and Historical Comparisons

In one example the reporting regulator system can reconstruct events from stored data. For example, data from multiple sensors dispersed hundreds of miles apart will typically be received by a central location at various time intervals, maybe as much as a month apart. The central computer can utilize the markings or attributes such as the time and date stamp to organize the data. Events can be can be reconstructed whenever desired. Further, the central computer can reconstruct a system wide event from start to finish using the marks on the data. The reporting regulator system also allows a user to compare current gas system conditions to the conditions that existed in the past such as years ago. For example, an event such as a leak over the past years could be observed and characterized. A user may witness a small leak in previous years and an escalation of the leak or lost gas in the recent months. The user can determine the difference in conditions (magnitude of change) to illustrate how a leak has become significant enough to locate and fix. The user can also determine if and how a system has changed or deviated from a normal or desirable operating condition.

Remote Viewing of Data and Remote Control of a Gas Transportation System

A portable-computing device such as a personal digital assistant or a laptop computer can be coupled to central computer 44 or to a reporting regulator via a wireless connection. Gas company personnel having a coupled portable computing device can access data, perform sorts and view important properties of an operational gas system at any time, nearly anywhere via a wireless Internet connection.

When gas company maintenance personnel cannot solve a problem, they often contact the manufacturer of a device they believe is faulty and explain the circumstances. Typically, the gas company and the manufacture try to solve the problems on long phone conversations. If the problem cannot be resolved over the telephone, then the manufacturer will try to correct the problem by visiting the troubled location. In one embodiment, a digital camera is connected to a port on reporting regulator 29 by gas company personnel. Pictures or video and audio of a site or installation are then sent via the reporting regulator to a manufacturer or a gas company superintendent.

In this manner with the reporting regulator coupled to the Internet, a "teleconference" can be conducted. Sensor data and video of the installation allows a learned problem solver to analyze problems from his office without spending time traveling and being out of communication range. This benefit will save the manufacturer and the gas company travel time and other expenses regarding installation and maintenance. Video often reveals improper wiring, improper installation, improper settings, and other problems at the site. Thus, troubleshooting can be performed remotely utilizing the reporting regulator as a communication hub.

Calculation of System Performance

A central computer can measure system parameters and can organize data to provide system characteristics. The system characteristics can be used to determine performance metrics. Sorted sensor data can be processed or used in mathematical formulas to provide additional system performance measurements. For example, the speed of gas flow in different parts of the gas transportation system can be determined by controlling individual reporting regulators and performing mathematical functions on the resulting sensor data. By activating a reporting regulator to create a momentary increase in pressure and then tracking how fast the pressure increase propagates through the gas transportation system, the average speed of the flowing gas can be determined. Reporting regulators downstream from the activated reporting regulator can measure and report the time required for the increased pressure to travel from sensor to sensor.

The gas velocity, such as the average gas velocity, can be calculated by central computer 44 using the equation velocity=distance×time. Further, properly sorting the data will reveal the magnitude and direction at which the higher pressure propagates through the gas transportation system. Further, attenuation of variables both in magnitude and duration will reveal system response to various inputs.

Diagnostics

Propagation of the pressure surge as discussed above can be used to determine or characterize gas flow patterns within a gas transportation system. A pressure surge can also allow a user to see how regulators act when dynamic conditions are present. If a regulator does not compensate for an increase in pressure, it can be assumed that the regulator is struck and thus, in need of maintenance. Self-diagnostic data from each reporting regulator can also be stored at a central location as well as in the memory of a reporting regulator.

Dynamic Demand Determination and Compensation

The central computer can quantify and compensate for dynamic demand. Specifically, a central computer can pinpoint areas which are in need of dynamic compensation. Dynamic demand occurs in most systems due to variations in consumption. Dynamic demand can cycle on a daily basis or a seasonal basis. Dynamic demand can also occur at any time. For example, dynamic demand or consumption can result from operation of a kiln or blast furnace in a factory from 8:00 AM to 5:00 PM each day. Dynamic consumption can also result from seasonal changes resulting from colder or warmer weather. The central computer can make control corrections by communicating with individual reporting regulators. Control corrections can be made in response to dynamic demands or demand predictions. System based control can achieve better compensation by adjusting reporting regulators.

Usage of Graphical Aids Set Points and Alarm Conditions

Many commercially available database organization and manipulation programs (instruction sets to organize sensor data) can create graphs based on the data in the database. In certain applications, a graphic display of the data in the database will provide additional flexibility in understanding the operation of the gas transportation system. For example, the gas company can set threshold values based on a graph of the "typical" or nominal operating points or parameters. Detection of values outside of the graphical norm would translate to abnormal system conditions. Thus, when data having a value that exceeds an appropriate threshold is detected the central computer can generate an alarm. The reporting regulator system is well adapted for warning gas company personnel that system abnormalities exist based on user selectable boundary conditions (threshold values). The threshold values can be easily set on a graphical display which shows normal operating conditions.

Alarms can be triggered by reporting regulators 300–310 or by central computer 44 responsive to data from reporting regulators. When an alarm is triggered, central computer 44 can notify emergency personnel through a pager network, e-mail or a web browser. After notification, emergency response personal can access data in database 44 to aid them in their critical decisions. It will normally be possible to correct problems from a remote location using the data acquisition and device addressing system described herein.

Instantaneous Consumption and Leakage Review

In current gas systems, mechanical meters can determine what is entering a gas transportation system and what is exiting that system on a monthly basis. However, this resolution is not good enough to accurately analyze leakage in a gas transportation system. In contrast, the reporting regulator system can determine the rate at which gas is leaking and hence how much gas has leaked during a time interval. The reporting regulator system can also determine how much gas is leaking at a defined pressure. All of these determinations can be done with a high degree of accuracy which was heretofore unachievable.

System parameters that are not available directly from sensors can be determined by utilizing mathematical functions (equations) such as those based on principles of physics. For example, using sensor data and the conservation of energy equation (what goes in must come out), flow rates for un-metered pipes can be determined. If it is determined that a certain quantity (flow volume) of gas is entering a pipe and less than that quantity is exiting the pipe, the lost quantity of gas can be calculated. Further, the location of the leakage can be determined and displayed to the user using a conservation of energy equation. The central computer at the direction of the instruction set can also determine how much the leak is costing the gas company on a daily basis by determining how much the lost gas would have sold for. A "search and fix plan" can be justified based on the results of calculations using the marked data. Other principles of physics such as superposition (what goes into a manifold or intersection must come out), can be utilized to calculate flow in un-metered pipes.

Locating Leaks

Other physical and mathematical principals can also be utilized by the central computer. For example, if there is a known leak and the user wants to determine the location of a leak, a user can systematically increase the pressure at various locations. This determination can be accomplished by controlling the reporting regulators 300–310 responsive to control signals containing the identification number of the regulator to be controlled. After increasing pressure in the suspected location, the user will check to see if there has been an increase in the volume of gas lost per unit time (un-accounted for gas). Higher pressure in an area with a leak will force more gas to escape during a given time period. Leaks can also be located by using the conservation of energy theory. Further, problems such as faulty meters, unauthorized taps, faulty sensors, faulty regulators and faulty pumps or compressors can be located using principals of physics.

Maximizing "Pass Through"

Controlling pressure from a central location by increasing pressures in certain areas and lowering pressure in other areas can maximize "pass through." Changing pressures within the fluid transportation system can eliminate eddies or "gas moving contrary to the desired direction." Elimination of eddy currents will maximize "pass through" volume. System control, responsive to the data made available by the reporting regulators will allow a gas transportation company to maximize profits while complying with governmental regulations. If governmental reports are required, the central computer can print the reports extracting and configuring the data contained in database 46.

Determining the Cause of Leaks

In some cases the reporting regulator system can determine the likely cause of a gas leak. If there is an abrupt change in pressure and lost gas after a spike in pressure, it is most likely that a leak has developed due to pressure relief valve failing to close. If there is an abrupt change in pressure and lost gas without evidence of a pressure increase, then the leak is most likely due to a rupture caused by construction equipment. If a leak develops slowly and increases over time, the leak is most likely due to corrosion in a pipe, a fitting, or a valve in the gas transportation system. Central computer can detect the rate of change of the magnitude of a leak and can predict or determined the cause of leaks. A rate of change threshold value can be set and, if the calculated rate of change exceeds the threshold value, the central computer indicates that a gas line has ruptured or that a valve or regulator is stuck in the open position.

Determining the Source of Impurities and Tracking Impurities

A reporting regulator can accept data from an impurity sensor or detector and transmit the data to a central processor. An impurity sensor can detect the existence of impurities such as paraffin, sludge, carbon dioxide, or water in a gas transportation system. Using data from reporting regulators, a central processor can determine the likely entry location of impurities in the gas transportation system. Data from reporting regulators can also be used to track the movement of impurities in gas transportation system 3. Further, impurity data received by a central computer 44 can be utilized to determine the effect of impurities on system performance (i.e. flow volume, pressures, lost delivery capacity, etc) by comparing historical data to the current data.

Additional features of the reporting regulator system include suggesting an optimum location for filter installations based on historical data. Optimum locations for filter installation may be where impurities have historically entered the system or where impurities have caused problems. Financial justification for installing a filter can be derived from operational costs associated with problems or maintenance created by impurities.

Scheduling Maintenance

The reporting regulator system allows gas companies to perform maintenance on an "as needed basis." Currently, gas companies perform maintenance on a periodic basis or in a crisis mode. A central computer can alert a user to approaching problems or potential problems. For example, when the pressure drop across a filter exceeds a user selected or predetermined threshold value, it can be assumed that the filter is becoming plugged. Based on this determination, the central computer 44 can schedule someone to replace the filter. Additional "non gas related" system data such as motor temperature for a motor that drives a compressor, and water level in a district pit can create and prioritize a maintenance list for the gas company maintenance crew. Thus, a central processor can announce and schedule maintenance based on marked sensor data.

Pressure Regulation and Automated Meter Reading for Industrial or Domestic Constuption In another application, reporting regulator 29 can be effectively utilized for measuring domestic consumption. In this embodiment the reporting regulator can replace a bulky mechanical meter, a mechanical pressure regulator and a communication box (if present). The reporting regulator can significantly reduce the hardware and labor required for installation. More importantly, the reporting regulator system can eliminate the monthly cost of physically visiting, reading and recording meter outputs from each household in a community. Thus, a central processor can automate billing for domestic consumption.

A further benefit of the reporting regulator system is superior accuracy in billing for actual energy delivered to the customer. Currently, the quantity of energy delivered is estimated based on the volume of gas delivered. The true energy content of the gas delivered is determined by many un- measured factors such as the energy content of the gas (BTU's), the amount of impurities in the gas (Water, Carbon Dioxide), the temperature of the gas, and other variables. Currently, all of these parameters are estimated.

Determining and Minimizing Frictional Losses

The central processor can calculate line loss due to the friction on the flowing gas due to the pipeline walls, filters and other restrictions. The pressure, velocity, temperature, or kinetic energy provided at the entry to a pipe, minus the kinetic energy which exits the pipe will provide the frictional loss through the pipe. This information is valuable for understanding inefficiencies and for justifying larger lines, higher pressures or system expansion. A central processor utilizing the appropriate instruction set can plan for expansion of a gas distribution system by utilizing data such as pressure, volume, and utilizing principles of physics such as the conservation of energy to determine line loss, projected flow requirements, and other variables to estimate required pressures and pipe sizes required for system expansion.

Asset Management

The electronic identification number and marking features of the reporting regulator system described herein provide additional benefits such as the improved administration of assets. Marked asset management data in database 46 will allow gas companies to track all kinds of data regarding reporting regulator and sensor performance, maintenance, calibration, testing, and repair. For example, asset management data regarding a reporting regulator such as repair history, alarm triggers, faulty operation/malfunctions, past installed locations, date shipped, repairs performed, date removed from service, date service preformed, service technician that repaired the repair or service location can be marked with the identification number and a time stamp. A very accurate mean time between failure (MTBF) rate can be calculated for reporting regulators and sensors. Reporting regulators which have a history of problems can be removed from a gas transportation system and returned to the manufacturer to determine what has caused the less than acceptable performance. Entire system maintenance costs can also be accurately determined.

Central computer 44 can detect a failure of a reporting regulator through poor performance or from diagnostic data from the failed regulator. Responsive to the failure, central computer can schedule personnel and order parts for replacement of the failed reporting regulator. Information about the failure can be placed in database 46 or it can be downloaded and stored in the memory of a reporting regulator utilizing the identification number marking. When a technician commences repair, the technician can access historical data regarding the failure. The technician can then load repair history data back into the reporting regulator memory prior to placing the unit back into service. Thus, a "cradle to grave" history on each reporting regulator can be easily maintained utilizing the identification number marking described herein.

Balancing Feed Lines

Database 46 can be sorted to display low-pressure locations utilizing central computer 44. Reporting regulators feeding the low-pressure locations can be adjusted to increase their output pressure. This control will reduce the number of areas in the gas transportation system which have problems resulting from low gas pressure. Additionally, a central computer using an instruction set and system wide pressure data can adjust the pressure in specific areas to balance feed line pressures. Viewing flow volume data from a series of reporting regulators can point out that a single reporting regulator is providing a disproportionate amount of gas to a specific area (an out of balance condition). A user can then make the appropriate corrections to improve the balance of the system.

While the above paragraphs describe many uses for a system of reporting regulators, these examples should not be used to limit the scope of the present invention.

Figure 5:
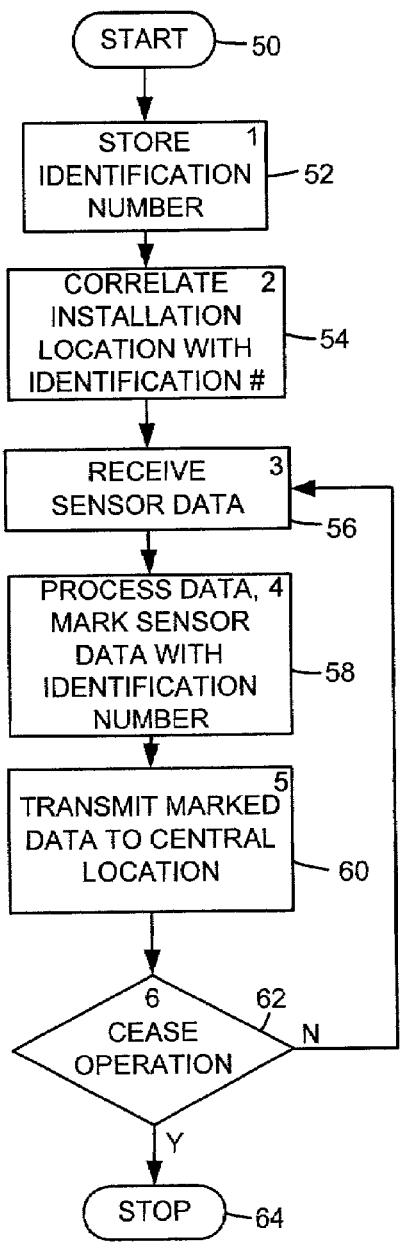
FIG. 5 is a flowchart describing a method of set-up and operation of a reporting regulator network.

Referring now to FIG. 5, a high level flowchart for use in managing a gas transportation system is depicted. In step 1, as illustrated in block 52, a reporting regulator is assigned an electronic identification number. It is preferred to store the identification number in the reporting regulator's memory. Please refer to the description of FIG. 3B for methods of assigning and storing electronic identification numbers.

Next, in step 2, as depicted in block 54, a relationship (correlation) between the assigned identification number and the operating location of the reporting regulator is determined. In one embodiment, the correlation is established by creating a relational database. The database can be created utilizing existing gas company location data (typically already in database form) and adding reporting regulator identification numbers to the appropriate column in the existing database(s). As discussed in the description of FIG. 3B, many different correlation methods could be used by a reporting regulator system and step 54 may not be required if the assigned identification number directly reveals the location of the reporting regulator.

In step 3, as illustrated in block 56, the reporting regulator operates according to a user-defined instruction set (software) to receive and store sensor data. For example, the instruction set determines the rate at which the sensor data from each port is read. The instruction set also determines when, where, and how the data is stored into memory. Further, the instruction set will define the type and format of sensor data that will be accepted at each port. For example, pressure data in digital format or temperature data in analog format may be received and stored by a reporting regulator.

Next, in step 4, as depicted in block 58, the reporting regulator processes the sensor data according to the instruction set. Many manipulations, calculations or processes could be performed on the sensor data. However, the reporting regulator marks the sensor data with attributes in accordance with the instruction set such that the data can be organized and manipulated. It is preferred to mark each piece of sensor data with a time stamp, a date stamp and the identification number of the reporting regulator which receives the data. Marking can be performed upon acquisition of the data or prior to transmission of the data by a reporting regulator. For example, the location in memory in which sensor data is stored may be correlated to a time and date slot. In this method, the data does not have to be stamped upon acquisition because the location in memory determines the date and time of data acquisition. Thus the data can be marked as it is transmitted to the central location.

Processing can also include calculations by the processor utilizing data from multiple sensors. For example, the volume of flow through a regulator can be calculated by utilizing the throttle body position, the difference in pressure across the throttle body and a stored operating profile. Processing may also include the compression of sensor data prior to storing the data in memory.

In step 5, as depicted in block 60, the marked data is then transmitted to a central location. Transmission may be initiated from a request for data by the central processor. Alternatively, the processor may initiate data transmission in response to a predetermined "time to download command" residing in the instructions set.

Then, in step 6 as illustrated in block 62, if the reporting regulator is instructed to cease operation the process will end at block 64. If no change occurs, or if no instructions are received to cease operation, the method returns to step 3 (block 56) and the reporting regulator continues to receive, mark and transmit sensor data.

The central computer 44 may provide a portion of, or all of the instruction set to the reporting regulator. Thus, a central processor 44 can set up a reporting schedule for all reporting regulators in the fluid transportation system. The central computer 44 can create a reporting schedule such that downloading (reporting) from reporting regulators can be performed in a "round robin" fashion. It will be understood that each of the operations described above as being performed by a processor or computer is actually performed by one or more routines, programs, applications or other instruction set stored or otherwise implemented by the processor or computer. These applications may be embodied in software, firmware hardware or any combination thereof. The fluid transportation system described herein solves burdensome and onerous problems involved with installing and operating a system for acquiring and managing data from a gas transportation system. The system and method provides an integrated pressure regulating, data gathering, data marking, data transmitting, and record management system. The foregoing has been a detailed description of preferred embodiments of this invention. Various modifications and additions can be made without departing from the spirit and scope of this invention. Accordingly, this description is meant to be taken only by way of example and not to otherwise limit the scope of the invention.

The invention claimed is:

1. A reporting regulator for controlling gas line pressure, the reporting regulator comprising:
   a throttling element for controlling a gas pressure; and a reporting module for distributing fluid transportation system sensor data to a plurality of receivers comprising:
an input for receiving sensor data from a fluid transportation system;
a memory coupled to the input and adapted to store the received sensor data, an instruction set, and an identification number, the identification number representative of the location of the reporting module;
a processor adapted to execute the instruction set, the instruction set instructing the processor to mark the sensor data with the identification number; and
a communication circuit coupled to the processor and the memory and adapted to transmit the marked data to the plurality of receivers.

2. A reporting module for distributing fluid transportation system sensor data to a plurality of receivers comprising:
an input for receiving sensor data from a fluid transportation system;
a memory coupled to the input and adapted to store the received sensor data, an instruction set, and an identification number, the identification number representative of the location reporting module;
a processor adapted to execute the instruction set, the instruction set instructing the processor to mark the sensor data with the identification number; and
a communication circuit coupled to the processor and the memory and adapted to transmit the marked data to receivers;
wherein the reporting module is disposed within a fluid pressure regulator; and
wherein the reporting module is further adapted to process sensor data and create a control signal responsive to the sensor data which can be utilized by the fluid pressure regulator to control the flow of fluid through the fluid pressure regulator.

3. A reporting module as in claim 1, wherein the reporting module is further adapted to calculate at least one of a gas transportation system parameter and a gas transportation system characteristic utilizing the received sensor data.

4. A reporting module as in claim 1, wherein the plurality of receivers further includes at least one computer adapted for creating a database.

5. The reporting module as in claim 4, wherein the communications circuit is adapted to transmit the marked sensor data to the at least one computer utilizing a wireless connection.

6. The reporting module as in claim 4, wherein the communication circuit is adapted to transmit the marked sensor data to the at least one computer utilizing an Internet protocol.

7. A reporting regulator for controlling gas line pressure and for communicating gas transportation system sensor data comprising:
a fluid throttling element;
a processor adapted to execute an instruction set, the instruction set instructing the processor to receive sensor data and to control the fluid throttling element in response to the sensor data;
a memory adapted to store the received sensor data and to store an attribute, the attribute representative of a feature of the sensor data, wherein the instruction set instructs the processor to mark the stored sensor data with the attribute;
a communication circuit coupled to the processor and adapted to transmit the marked data to a computer.

8. The reporting regulator as in claim 7, wherein the instruction set and the processor are adapted to calculate one of a system parameter and a system characteristic utilizing the received gas transportation system data.

9. The reporting regulator as in claim 8, wherein the system characteristic is a flow of gas through a predefined location.

10. The reporting regulator as in claim 7, wherein the attribute is one of an identification number, a location, a time, a date, a data type, a sensor type, a priority, a MAC address, and an alarm status.

11. A data management system for a gas transportation system comprising:
a central computer adapted for creating a database; and
a plurality of reporting regulators, each reporting regulator including:
a throttling element for controlling a gas pressure within the gas transportation system; and
a processor adapted to receive data from at least one gas transportation system sensor, for marking the received data with a unique identification number and for transmitting the data responsive to an instruction set;
wherein the central computer is adapted to create a database utilizing the marks on the sensor data.

12. The data management system as in claim 11, wherein the unique identification number is an origin of the sensor data.

13. The data management system as in claim 11, wherein the central computer is further adapted to calculate one of system performance and a system parameter utilizing the received data.

14. The data management system as in claim 11, wherein the central computer is adapted to sort the marked data responsive to user commands.

15. The data management system as in claim 11, wherein a first one of the plurality of reporting regulators is adapted to control functions of a second one of the plurality of reporting regulators.

16. The data management system as in claim 11, wherein the sensor data indicates a device status determined by at least one reporting regulator in the plurality of reporting regulators.

17. The data management system as in claim 11, wherein the central computer is adapted to prepare a customer invoice utilizing the data in the database.

18. The data management system as in claim 11, wherein the central computer transmits an instruction set to at least one reporting regulator in the plurality of reporting regulators, wherein the instruction set configures the operation of the at least one reporting regulator.

19. The data management system as in claim 11, wherein the central computer is adapted to command the at least one reporting regulator to transmit the marked data to the database.

20. The data management system as in claim 11, wherein the plurality of reporting regulators are adapted to transmit asset management information, and wherein the central computer is adapted to utilize the asset management information to create a maintenance report.

21. The data management system as in claim 11, wherein the central computer is adapted to determine a graphical representation of gas transportation system events and to provide the graphical representation to a display device.

22. A method of managing gas transportation system data comprising:
assigning a unique electronic identification number to a reporting regulator;

receiving, at the reporting regulator, sensor data from a sensor adapted for operation in a gas transportation system;

using the reporting regulator to control at least one pressure within the gas transportation system utilizing the received sensor data;

marking the received sensor data with an attribute at the reporting regulator; and transmitting said marked sensor data from the reporting regulator to a central location.

23. The method of managing gas transportation system data as in claim 22, wherein the step of transmitting further includes transmitting data utilizing a wireless Internet connection.

24. The method of managing gas transportation system data as in claim 22, further including creating a database at a central location using the marked data.

25. The method of managing gas transportation system data as in claim 24, further including the step of creating keys and links in the database as the marked data is stored.

26. A reporting regulator for controlling fluid pressure within a gas transportation system and for communicating gas transportation system data to a central location comprising:
- an electrical interconnection coupled to the reporting regulator;
- at least a first port coupled to said electrical interconnection, the first port for receiving gas transportation system sensor data;
- a memory coupled to said electrical interconnection for storing the received sensor data, said sensor data having at least one attribute;
- a processor coupled to said electrical interconnection for uniquely marking the received sensor data with the at least one attribute; and,
- a communication circuit coupled to the electrical interconnection for transmitting the marked data to a central location.

27. The reporting regulator as in claim 26, further comprising a time clock coupled to the electrical interconnection to produce a time stamp, wherein the at least one attribute is the time stamp.

28. The reporting regulator as in claim 26, further comprising a fluid throttling element coupled to the processor, the fluid throttling element for controlling a gas pressure at a fluid output port of the reporting regulator.

29. A reporting regulator for controlling fluid pressure within a gas transportation system and for communicating gas transportation system data to a central location comprising:
- an electrical interconnection;
- at least a first port coupled to said electrical interconnection, the first port for receiving gas transportation system sensor data;
- a memory coupled to said electrical interconnection for storing the received sensor data, said sensor data having at least one attribute;
- a processor coupled to said electrical interconnection for uniquely marking the received sensor data with the at least one attribute; and,
- a communication circuit coupled to the electrical interconnection for transmitting the marked data to a central location;
- a first pressure sensor;
- a second pressure sensor; and
- a throttle element position sensor, wherein said first and second pressure sensors and said throttle element position sensor are coupled to said processor, wherein said processor calculates flow volume through said reporting regulator utilizing data from said first and second pressure sensors and said throttle element position sensor and creates flow volume sensor data to be marked by the reporting regulator.

30. The reporting regulator as in claim 26, wherein said communication circuit is adapted to transmit sensor data to a central location in response to a request for information by the central location.

31. The reporting regulator as in claim 26, wherein, the instruction set is adapted to instruct the processor to conduct at least one mathematical process on the received sensor data.

32. The reporting regulator as in claim 26, wherein the communication circuit transmits marked data at a predetermined time in response to the instruction set.

33. The reporting regulator as in claim 26, further comprising a port identification number assigned to the at least first port, wherein the reporting regulator is further adapted to mark the sensor data with the port identification number corresponding to a port where the data is received.

34. The reporting regulator as in claim 26, wherein said processor is adapted to mark the sensor data prior to storing the data in the memory.

35. The reporting regulator as in claim 26, further including an initialization device wherein the initialization device is adapted to load the identification number into the memory prior to installing the reporting regulator into a gas transportation system.

36. The reporting regulator as in claim 26, further including an initialization device wherein the initialization device is adapted to load the identification number into the memory after the reporting regulator is installed into a gas transportation system.

* * * * *

UNITED STATES PATENT AND TRADEMARK OFFICE
CERTIFICATE OF CORRECTION

PATENT NO.         : 7,049,975 B2                                        Page 1 of 1
APPLICATION NO. : 10/052426
DATED              : May 23, 2006
INVENTOR(S)       : Richard J. Vanderah et al.

It is certified that error appears in the above-identified patent and that said Letters Patent is hereby corrected as shown below:

In the Specification:

At Column 2, line 46, "DOT's" should be -- Dots --.

At Column 4, line 29, "include a commercially" should be -- include commercially --.

At Column 5, line 2, "maybe" should be -- may be --.

At Column 5, line 8, "antennae" should be -- antenna --.

At Column 5, line 57, "modem" should be -- modern --.

At Column 7, line 12, "it's" should be -- its --.

At Column 7, line 33, "it's" should be -- its --.

At Column 8, line 45, please remove the bold font from -- 1000 --.

At Column 10, line 33, "Events can be can" should be -- Events can --.

At Column 10, line 62, "manufacture" should be -- manufacturer --.

At Column 11, line 47, "struck" should be -- stuck --.

At Column 12, line 1, "Aids" should be -- Aids, --.

At Column 13, line 35, "determined" should be -- determine --.

At Column 14, line 13, "Constuption" should be -- Consumption --.

At Column 14, line 30, "un- measured" should be -- unmeasured --.

At Column 14, line 31, "BTU's" should be -- BTUs --.

At Column 15, line 45, "54." should be -- 54, --.

Signed and Sealed this

Third Day of April, 2007

JON W. DUDAS
*Director of the United States Patent and Trademark Office*